J. H. CROWELL.
POULTRY AUTOMATIC MASH FEEDER.
APPLICATION FILED NOV. 1, 1911.
1,090,286.
Patented Mar. 17, 1914.
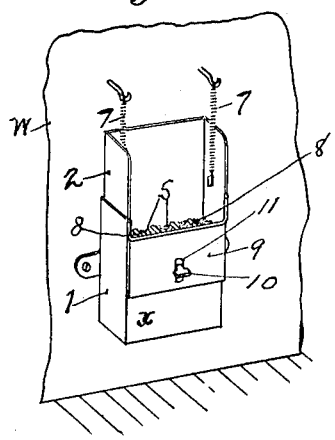
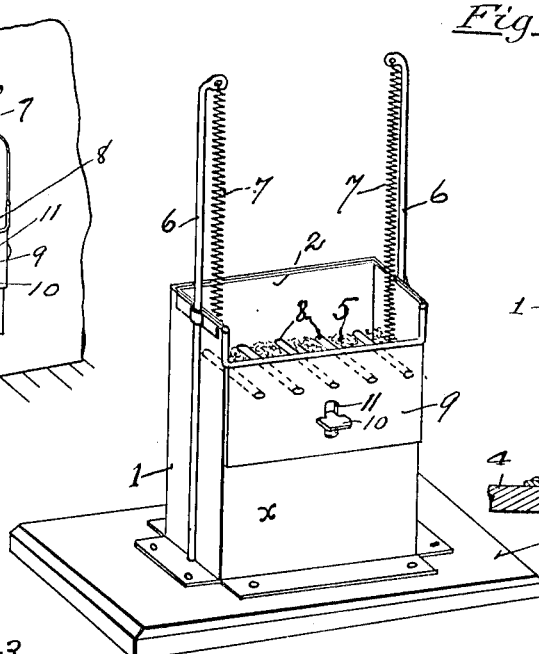
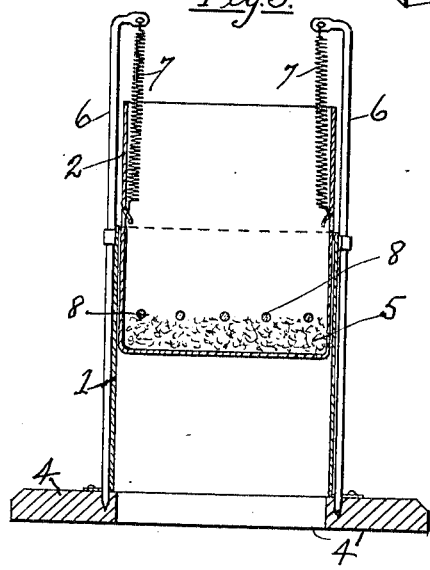
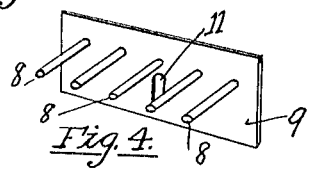
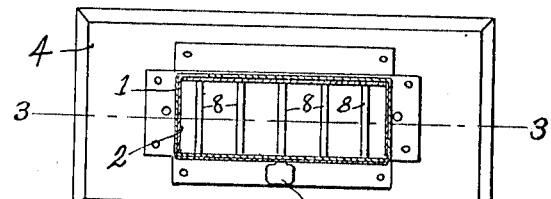
WITNESSES
Alfred Wilson
Arthur A. Rhodes
INVENTOR
John H. Crowell
By Henry Marsh Jr.
ATTY.

UNITED STATES PATENT OFFICE.

JOHN H. CROWELL, OF VINEYARD HAVEN, MASSACHUSETTS.

POULTRY AUTOMATIC MASH-FEEDER.

1,090,286.   Specification of Letters Patent.   Patented Mar. 17, 1914.

Application filed November 1, 1911. Serial No. 658,017.

*To all whom it may concern:*

Be it known that I, JOHN H. CROWELL, a citizen of the United States, residing in Vineyard Haven, in the county of Dukes and State of Massachusetts, have invented a new and useful Poultry Automatic Mash-Feeder, of which the following is a specification.

The purposes of my invention are to provide an apparatus for feeding dry feed, commonly called "mash", to poultry, arranged to hold a considerable quantity of the feed in the first instance, and adapted to raise and maintain the feed at all times at a fixed level or elevation convenient and easily accessible by the fowls, and which will protect the feed from inroads by rats, or animals. These purposes I accomplish by the new and novel construction, combination and arrangement of parts hereinafter described, and illustrated in the accompanying drawings, in which:

Figure 1 is an elevation in perspective of my feeder loaded and ready for use as a portable feeder. Fig. 2 is a top plan view of my feeder, part in section. Fig. 3 is a longitudinal section on line 3—3 of Fig. 2, showing the feed receptacle partially emptied. Fig. 4 is a rear perspective view of the feed rack or grating. Fig. 5 is a perspective view illustrating one mode of attaching my feeder to the side wall of a poultry house for use as a stationary feeder. Fig. 6 is a section of Fig. 1 taken on a vertical plane passing through the slot 11.

Similar reference letters and numerals indicate like parts throughout the drawings.

Referring to the drawings: My feeder consists of two members, of any desired cross-section, although for convenience I have shown them as rectangular. The body member 1, in the portable form of my invention, is secured to a movable base or plate 4, provided, preferably, with a slot or aperture 4¹ through which droppings, if any, of the dry feed may escape or be removed, if necessary. Said member 1 is a tubular casing, though its back and two sides may be open frame work since said member is intended to serve as a guideway in which the member 2 operates, but its front wall is solid in order that it may serve as the fourth side of the member 2, as hereinafter described. Said front wall of said member 1 is of less height than the other walls in order that fowls may easily reach over it to get at the feed.

The member or conveyer 2 has a solid bottom and three vertical side walls, is open throughout its top and front, and is fitted for free reciprocating vertical movements inside said member 1, between the back and side walls of the latter and the rack hereinafter described, and is arranged and adapted to contain a considerable quantity of dry feed or "mash", as 5, when pushed downward within the member 1 so that the front wall of the member 1 will constitute the fourth wall of said member 2, thereby confining the contained feed, with its top exposed and easily accessible by the fowls. Said member or conveyer 2 is connected to and suspended from davit-like posts 6, 6, disposed at opposite sides of the member 1, by helical springs 7, 7, extensible as the member or conveyer 2 is pushed downward inside the member 1 and filled with feed, and held extended by a rack (hereinafter described) arranged to contact with the top surface of the feed. Said springs react to raise said member 2 and gradually uncover its open front as the feed surface is lowered by the feeding therefrom of the fowls, thereby holding the feed up against the under side of the rack at the same fixed easily accessible level at all times.

The feed rack is composed of a plurality of parallel horizontally disposed rods or bars 8 located near the top of the front wall $x$ of the member 1 and extending into said member but not in contact with the back or side walls of the latter. Said rods are preferably attached to a plate 9 and are removably inserted through perforations in the front wall $x$, and said plate is held in place by a turn button 10 arranged to engage a slot 11 in said plate. Such arrangement I have found more convenient for purpose of filling the member or conveyer 2 with the feed, as after the member is filled the rack is inserted, and the springs hold the upper surface of the feed in contact with the under side of the rack, so that the fowls may easily reach it. The rack may however be made stationary or a grating may be substituted for it, and the feed pressed down through such rack or grating. In either form the rack or grating prevents the scattering and waste of the feed.

In the stationary form of my invention, shown in Fig. 5, the construction and mode of operation are the same as already described, except that the base plate and davits are omitted, the springs being suitably attached to the wall of the poultry house at the proper distance above the floor, and the member 1 likewise attached to said wall, as W, at a proper height for the fowls to easily reach the feed through the rack or grating, just as they can in the portable form hereinbefore described.

I preferably construct the member 1 of metal in order to prevent rats and the like from reaching the feed, and the rack or grating serves to prevent other animals from getting at the feed.

It will be noted that my conveyer has its top and one side open throughout, is arranged for vertical movement within the casing, and is disposed therein with its open side against and closed by the lower side of the casing, and therefore the fowl must always feed over the top of said lower side of the casing at the same predetermined fixed level, and the higher walls of the casing will prevent scattering of the feed until the conveyer is raised upward until its three solid walls are enabled to serve in like manner, and that said solid lower wall of the casing will at all times cover the unexposed portion of the open side of the conveyer and confine the feed.

I make no claim to the form or arrangement of the springs, as any form or arrangement of springs or weights that will actuate the feed containing member or conveyer 2 in or on a tubular or guiding member so as to always maintain the feeding level of the feed at a fixed accessible point in said body member is obviously within the principle and scope of my invention.

I am aware that a feeder having a tubular casing and a false floor supporting the feed and movable vertically within said casing has been heretofore shown and described; and that in such construction the movable floor was liable to become cramped and bound, and furthermore that the feed was liable to sift through the space between the edges of the floor and the casing walls.

The especially advantageous, novel and useful feature of my invention, herein described and shown in the accompanying drawings, is that my conveyer having a close bottom and three vertical sides or walls will be guided evenly by the tubular casing within which it is fitted for vertical sliding movement, will not become cramped in its movement, and will hold the feed closely confined and free from appreciable liability to loss or leakage.

I claim:

1. In feeders having a conveyer automatically conveying feed vertically within a tubular structure to a fixed location, a conveyer consisting of a bottom and three vertical sides, the fourth side being open, slidable vertically within said tubular structure, in combination with a horizontal rack held stationary by said tubular structure and at a fixed location below the top edge thereof and opposite said fourth or open side of said conveyer and projecting through said open side to within a fixed distance of the three vertical sides of said conveyer, substantially as and for the purpose described.

2. In a mash feeder having a tubular body and a conveyer vertically movable therein, a conveyer having a solid floor and three vertical walls supported by said floor and a fourth side open throughout, and arranged for vertical movement within said tubular body, in combination with a rack held stationary in one side of said tubular body at a fixed location below the top edge of the latter and opposite said open side of said conveyer and projecting through said open side to within a fixed distance of the three vertical sides of said conveyer, and means for imparting vertical movement to said conveyer.

3. An automatic poultry mash feeder comprising a tubular casing having one of its walls solid and of less height than its other walls, a conveyer consisting of a solid bottom and three vertical walls, its top and fourth side being open throughout, said conveyer arranged for reciprocating vertical movement within said casing, and disposed therein with its open side against and closed by said solid lower wall of said casing, and a rack secured to said lower side of the casing at a fixed location below the top edge thereof, and projecting horizontally therefrom through the open side of the conveyer and spaced as to its three edges a distance from the three vertical walls of said conveyer, and means for automatically actuating said conveyer.

JOHN H. CROWELL.

Witnesses:
 HENRY MARSH, Jr.,
 ARTHUR A. RHODES.